Nov. 17, 1964  R. B. SIVYER  3,157,380
BALL VALVES
Filed June 27, 1962
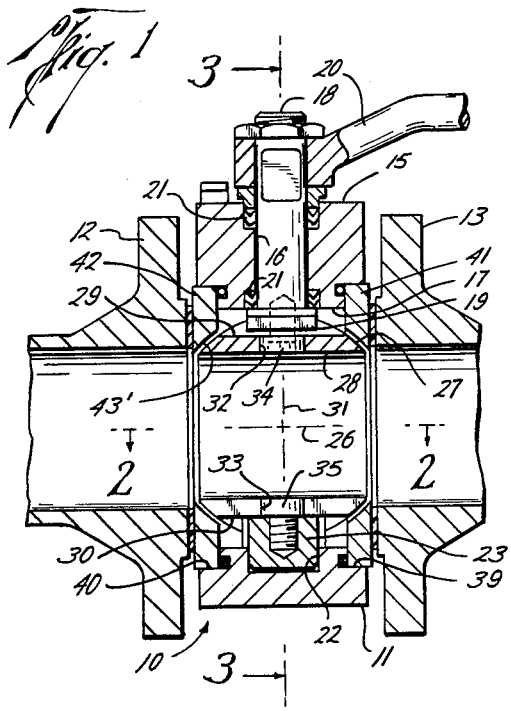
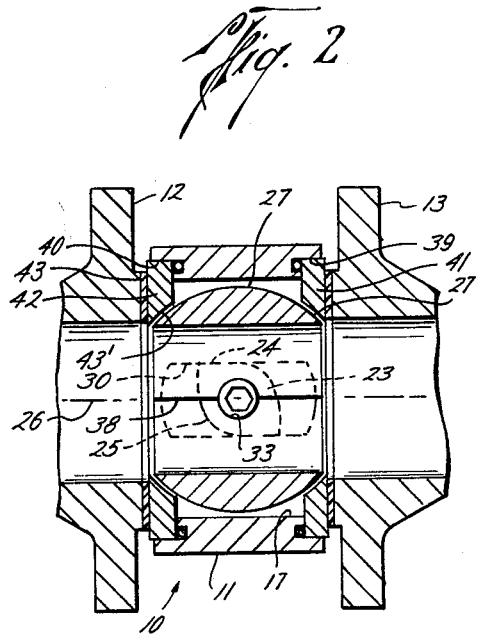
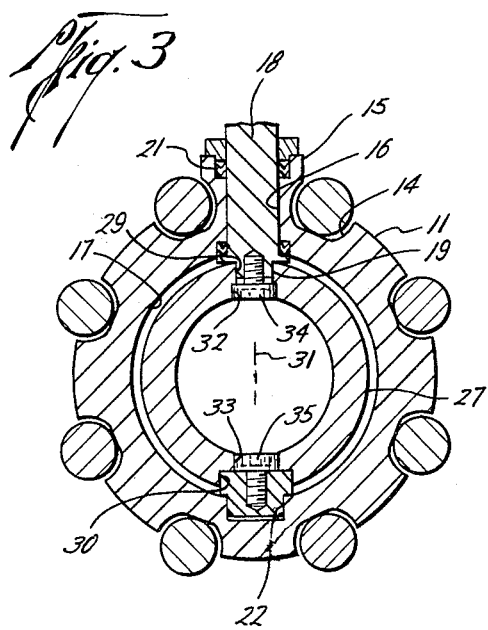
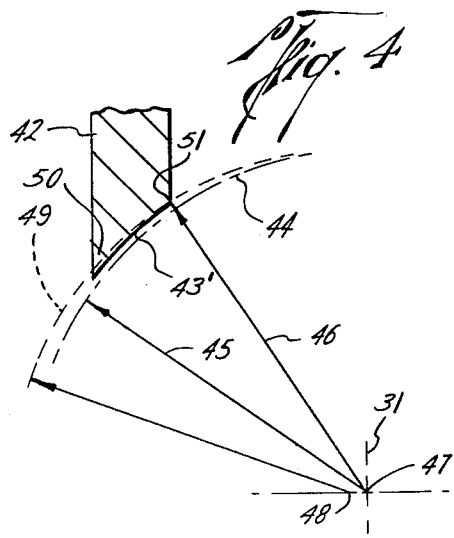
Robert B. Sivyer
INVENTOR.

United States Patent Office 3,157,380
Patented Nov. 17, 1964

3,157,380
BALL VALVES
Robert B. Sivyer, 1314 Beutel, Houston, Tex.
Filed June 27, 1962, Ser. No. 205,737
8 Claims. (Cl. 251—163)

This invention relates to ball valves, and more particularly, to improved means for pressure sealing a ball valve for high temperature, high pressure applications.

Heretofore, ball valves have relied upon resilient sealing members disposed in the passageway through the valve body to provide a fluid tight seal with the ball member when the valve is in a closed position. Under high temperature and pressure conditions, the resilient sealing members have a tendency to leak. After repeated operations of the valve over a period of time the leakage problem is particularly prevalent. In an effort to overcome the leakage problem thus encountered under severe conditions of operation, complicated mechanical structures have evolved wherein one of the sealing members is subjected to mechanical compression by an independently operated device to provide an additional sealing pressure while the valve is in a closed position.

Accordingly, it is an object of the present invention to provide new and improved means for mechanically compressing the pressure seals in a ball valve in a simple and inexpensive manner to provide a positive fluid tight seal in a closed position of the valve.

Another object of the present invention is to provide a new and improved ball valve wherein the ball member is mechanically moved to mechanically compress the sealing members relative to the valve body in a closed position of the valve.

Another object of the present invention is to provide a new and improved ball valve assembly.

A still further object of the present invention is to provide a new and improved ball valve which is operable over a long period of time in high temperature and pressure applications.

Apparatus in accordance with the present invention includes a tubular valve body member in which a ball closure member is mounted. The ball closure member has the normal full-size opening therethrough for providing a fluid communication path. The valve body and ball member are received and sealed between flange couplings. The valve body has metal sealing elements arranged to provide a pressure seal when the valve is in a closed position. The ball closure member is split and includes shoulders thereon which are engageable with a cam member in the valve body. Thus, when the ball member is rotated relative to the cam member, the ball member is cammed apart and when the ball member is in a closed position the cammed movement of the ball member provides for mechanical compression of the sealing elements and a line contact seal.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawing in which:

FIG. 1 is a view in cross-section through a valve embodying the present invention, the valve being shown in a closed position;

FIG. 2 is a view in cross-section taken along line 2—2 of FIG. 1;

FIG. 3 is a view in cross-section taken along line 3—3 of FIG. 1; and

FIG. 4 is a partial view illustrating the relationship between the ball member and the sealing elements in open and closed position of the ball relative to a sealing element.

Referring now to FIGS. 1–3, the illustrated ball valve 10 has a tubular valve body 11 sized to be received between flange connections 12, 13 on pipes. The periphery of the valve body 11 is provided with bolt recesses 14. Between a pair of such bolt recesses, valve body 11 has an upper valve stem extension portion 15 (FIGS. 1 and 3). Extension portion 15 is suitably provided with a bore 16 which extends to the cylindrical chamber 17 formed within the body 11. A valve stem 18 is received in the bore 16 and its lower end has a rectangularly shaped lug portion 19, while its upper end is arranged for connection with a valve handle 20. Suitable seals 21 are provided between the valve stem and body. The valve body 11 also has a lower socket 22 opening to the chamber, the lower socket 22 being diametrically aligned with bore 16. Socket 22 is square shaped and receives a cam member 23. The cam member 23 (as shown in FIG. 2) has parallel side, edge surfaces 24 and curvilinear end surfaces 25 giving the cam a somewhat parallelogram shape in plan view. The side, edge surfaces 24 of cam 23 are disposed to extend in the same direction as the axis 26 of the cylindrical chamber 17.

The ball valve element 27 for the valve 10 has spherically shaped outer surfaces and a full sized cylindrical passageway 28 about a central axis 26. The ball element 27 has diametrically positioned, lengthwise extending slots 29 and 30 in its outer surfaces, the slots extending in the same direction as the axis 26 of the cylindrical passageway 28. The slots 29, 30 of the ball element respectively receive the valve stem lug 19 and the cam 23. Along an axis 31 of rotation, the ball element 27 is provided with guide bores or trunnions 32, 33, and bolts 34, 35 extending through the respective guide bores 32, 33 positively affixing the ball element in the valve body in an open position as well as providing pivot means.

Hence, as shown in FIGS. 1 and 3, upper bolt 34 attaches to the stem lug 19 through opening in the valve element 27 while lower bolt 35 attaches to the cam 23 through opening 33 in the valve element 27. Openings 32, 33 are aligned with the central turning axis 31 of the valve stem element 18 and sized to pivotally mount the ball element 27 in the valve body 10. The valve stem lug 19 in the slot 29 serves to transmit turning forces from the valve stem 18 to the ball element 27.

The ball element 27 is split or parted between the lower slot and passageway along a plane generally formed by the passageway central axis 26 and axis or rotation 31 and the split is identified by numeral 38 (shown in FIG. 2). The cam 23 is shaped to widen the split upon rotation thereby expanding the ball element 27. The expansion may be controlled as desired but preferably occurs mainly when the passageway 28 approaches a transverse position relative to the central axis 26 of the chamber 17. Hence, the ball element 27 will widen only slightly during the first 80° of turn and is expanded full in the next 10° of turn.

The valve body 10 has annular recesses or counterbores 39, 40 in the edge surfaces of the tubular body to receive annularly shaped metal sealing elements 41, 42. Sealing elements 41, 42 are tightly held in the recesses by the bolted flange connections 12, 13. Gaskets or spacer elements 43 may be provided between the respective flange connections and sealing elements.

Each sealing element 41 and 42 is provided with an annular, arcuate sealing surface 43'. As shown in FIG. 4, the curvature of a sealing surface 43' is less than the curvature of the ball surface illustrated by the dashed line 44 because of different radii 45, 46 from an origin point 47. When the ball is expanded, in the closed or closing position, the curvature 49 of the ball surface applies sealing forces at points 50 and 51 on the sealing elements 41 and 42. Further, when the ball is expanded, in the closed or closing position of the valve, the origin point for the curvature of the ball shifts to both sides of axis of rotation to a point 48 (only one shown). The curvature of the ball member surface as shown by dashed line 49 is such that sealing forces are applied on a line of contact between the sealing surface and the surface of the ball and the sharp pointed tip 50 of the sealing element formed between a sealing surface and outer surface and adjacent portions are actually flexed outwardly providing an extremely tight metal-to-metal seal.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A ball valve comprising: a valve body having end surfaces arranged for positioning between pipe flanges, said end surfaces having openings to a hollow interior, disc-like, metal sealing, annular rings received in said openings, said rings being adapted for retention in said openings between said valve body and pipe flanges, said rings having facing sealing surfaces, a ball member received in said hollow interior, said ball member having a full opening passageway, means coupled to said ball member for providing pivotal movement of said ball member in said valve body between an open position where said passageway is in fluid communication with said body openings and a closed position where said passageway is sealed off from said body openings by sealing contact between said ball member and said sealing surfaces, said ball member having a slot in its outer surface extending in the same direction as said passageway, said ball member having a single slit therein extending between said passageway and said slot, cam means in said valve body cooperable with said slot and slitted ball member in a closed position of said ball member to separate said ball member at said slit and thereby expand said ball member into sealing contact with said sealing surfaces, said cam means being diametrically positioned relative to said pivotal movement means.

2. A ball valve comprising: a valve body having openings to a hollow interior and sealing means about said openings, a ball member received in said hollow interior, said ball member having a full opening passageway, trunnion means mounting said ball member for pivotal movement in said valve body between an open position where said passageway is in fluid communication with said body openings and a closed position where said passageway is sealed off from said body openings by sealing contact between said ball member and said sealing means, said ball member having a slot in its outer surface extending in the same direction as said passageway, said ball member having a single slit therein extending between said passageway and said slot, cam means in said valve body cooperable with said slot and slitted ball member in a closed position of said ball member to separate said ball member at said slit and thereby expand said ball member into sealing contact with said sealing means, means for rotating said ball member, one of said trunnion means being attached to said rotating means, the other of said trunnion means being attached to said cam means.

3. A ball valve comprising: a valve body having openings to a hollow interior and metal sealing surfaces about said openings, said surfaces being of arcuate form with a first curvature terminating at an inwardly-facing tip portion, a spherically shaped, metal ball member with a second curvature which is greater than said first curvature, said ball member being received in said hollow interior, said ball member having a full opening passageway, means mounting said ball member for pivotal movement in said valve body between an open position where said passageway is in fluid communication with said body openings and a closed position where said passageway is sealed off from said body openings by sealing contact between said ball member and said sealing surfaces, said ball member having a slot in its outer surface extending in the same direction as said passageway, said ball member having a single slit therein extending between said passageway and said slot, cam means in said valve body cooperable with said slot and slitted ball member in a closed position of said ball member to separate said ball member at said slit and thereby expand said ball member into contact with said arcuate sealing surfaces with sufficient force to flex said tip portion and provide an additional sealing action.

4. A ball valve comprising: a valve body having openings to a hollow interior and at least one metal sealing surface about at least one of said openings, said surface being of arcuate form with a first curvature terminating at an inwardly-facing tip portion, a spherically-shaped, metal ball member with a second curvature which is greater than said first curvature, said ball member being received in said hollow interior, said ball member having a full opening passageway, means mounting said ball member for pivotal movement in said valve body between an open position where said passageway is in fluid communication with said body openings and a closed position where said passageway is sealed off from said one body opening by sealing contact between said ball member and said one sealing surface, means in said valve body cooperable with said ball member in a closed position of said ball member to urge said ball member into contact with said sealing surface with sufficient force to flex said tip portion and provide an additional sealing action.

5. A ball valve comprising: a valve body having end surfaces arranged for abutment with pipe flanges so that said valve body may be disposed between facing, bolted pipe flanges, said end surfaces having openings extending to a hollow interior, metal sealing surfaces of arcuate form about said openings, a ball member received in said hollow interior, said ball member having a full opening passageway and oppositely positioned slots in the outer surface thereof, said slots being elongated with parallel side surfaces extending the same direction as said passageway, a valve stem rotatively received in said body and having a lug portion arranged to cooperate with the side surfaces of one of said slots to rotate said ball member between an open position where said passageway is in communication with said body openings and a closed position where said passageway is sealed off from said body openings by said sealing surfaces, means to couple said lug and ball member to one another, said ball member having a single slit therein extending between said passageway and said other slot, cam means in said valve body cooperable with the side surfaces of said other slot and slitted ball member in a closed position of said ball member to separate said ball member at said slit and thereby expand said ball member into sealing contact with said sealing surfaces.

6. A ball valve comprising: a valve body having end surfaces arranged for abutment with pipe flanges so that said valve body may be disposed between facing, bolted pipe flanges, said end surfaces having openings extending to a hollow interior, metal sealing rings received in said openings and having metal sealing surfaces of arcuate form about said openings, a ball member received in said hollow interior, said ball member having a full opening passageway and oppositely positioned slots in the outer surface thereof, said slots being elongated with parallel side surfaces extending the same direction as said passageway, a valve stem rotatively received in said body and having a lug portion arranged to cooperate with the side surfaces of one of said slots to rotate said ball member between an open position where said passageway is in communication with said body openings and a closed position where said passageway is sealed off from said body openings by said sealing surfaces, means to couple said lug and ball member to one another, said ball member having a single slit therein extending between said passageway and said other slot, cam means in said valve body cooperable with the side surfaces of said other slot and slitted ball member in a closed position of said ball member to separate said ball member at said slit and thereby expand said ball member into sealing contact with said sealing surfaces, and pivot means including a guide bore in said ball member between said other slot and said passageway and a pin received in said guide bore and connected to said cam means.

7. A ball valve comprising: a valve body having end surfaces arranged for abutment with pipe flanges so that said valve body may be disposed between facing, bolted pipe flanges, said end surfaces having openings extending to said hollow interior, metal sealing surfaces of arcuate form about said openings, a ball member received in said hollow interior, said ball member having a full opening passageway, a valve stem rotatively received in said body and coupled to said ball member to rotate said ball member between an open position where said passageway is in communication with said body openings and a closed position where said passageway is sealed off from said body openings by said sealing surfaces, a slot in the outer surface of said ball member disposed opposite to said valve stem, said slot being elongated with parallel side surfaces extending the same direction as said passageway, said ball member having a single slit therein extending between said passageway and said slot, cam means in said valve body cooperable with said slot and slitted ball member in a closed position of said ball member to separate said ball member at said slit and thereby expand said ball member into sealing contact with said sealing surfaces.

8. A ball valve comprising: a valve body having openings to a hollow interior and at least one sealing surface about at least one of said openings, said sealing surface being of arcuate form with a first curvature terminating at an inwardly facing tip portion, a spherically shaped ball member with a second curvature which is greater than said first curvature, said ball member being received in said hollow interior, said ball member having a full-opening passageway, means mounting said ball member for pivotal movement in said valve body between an open position where said pasageway is in fluid communication with said body openings and a closed position where said passageway is sealed off from said one body opening by said ball member and said one sealing surface, means in said valve body cooperable with said ball member in a closed position of said ball member to urge said ball member into contact with said sealing surface with sufficient force to flex said tip portion and provide a surface-to-surface seal.

References Cited by the Examiner
UNITED STATES PATENTS

| | | | |
|---|---|---|---|
| 2,277,975 | 3/42 | Heggem | 251—163 |
| 2,696,968 | 12/54 | Fillips | 251—192 |
| 2,751,185 | 6/56 | Shand | 251—315 XR |
| 3,124,333 | 3/64 | Sivyer | 251—161 |

FOREIGN PATENTS

| | | |
|---|---|---|
| 526,420 | 8/55 | Italy. |
| 908,547 | 4/54 | Germany. |

M. CARY NELSON, *Primary Examiner.*

ISADOR WEIL, *Examiner.*